US009313022B2

(12) United States Patent
Jacquin et al.

(10) Patent No.: US 9,313,022 B2
(45) Date of Patent: Apr. 12, 2016

(54) HOMOMORPHIC CRYPTOGRAPHY MODELING IN SUPPORT OF PRIVACY POLICIES

(71) Applicant: Xerox Corporation, Norwalk, CT (US)

(72) Inventors: Thierry Jacquin, St. Martin d'Uriage (FR); Johan Clier, Meylan (FR); Ioan Calapodescu, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/665,356

(22) Filed: Mar. 23, 2015

(65) Prior Publication Data

US 2015/0195083 A1  Jul. 9, 2015

Related U.S. Application Data

(63) Continuation-in-part of application No. 14/141,548, filed on Dec. 27, 2013, and a continuation-in-part of application No. 14/202,477, filed on Mar. 10, 2014.

(51) Int. Cl.
*G06F 17/00* (2006.01)
*H04L 9/00* (2006.01)
*H04L 9/14* (2006.01)
*G06F 21/62* (2013.01)

(52) U.S. Cl.
CPC ............ *H04L 9/008* (2013.01); *G06F 21/6218* (2013.01); *H04L 9/14* (2013.01); *H04L 2209/24* (2013.01)

(58) Field of Classification Search
CPC ................................ G06F 8/316; H04L 9/008
See application file for complete search history.

(56) References Cited

U.S. PATENT DOCUMENTS

| 7,500,111 | B2 * | 3/2009 | Hacigumus et al. .......... 713/193 |
| 8,515,058 | B1 | 8/2013 | Gentry |
| 8,667,062 | B2 | 3/2014 | Aad et al. |
| 8,861,716 | B2 | 10/2014 | Halevi et al. |
| 8,862,895 | B2 | 10/2014 | Rieffel et al. |
| 2013/0170640 | A1 | 7/2013 | Gentry |

OTHER PUBLICATIONS

Bostrom, Gustav; Database encryption as an Aspect; 2004; Retrieved from the Internet <URL: aosd.net/workshops/aosdsec/2004/AOSDSEC04_Gustav_Bostrom.pdf>; pp. 1-6 as printed.*

(Continued)

*Primary Examiner* — Michael Chao
(74) *Attorney, Agent, or Firm* — Richard H. Krukar; Kermit D. Lopez; Luis M. Ortiz

(57) ABSTRACT

Data privacy is becoming increasingly important and, in some jurisdictions, required. Access to private data can be controlled by forcing all access to go through minimizations services that allow only authorized access to private data. These minimization services can become processing bottlenecks if the only way to modify private data is by way of requests to the minimization service. Certain homomorphic operations allow for encrypted data to be modified without being first decrypted although other operands must be encrypted. Augmenting a minimization service to provide a public encryption key provides for encryption of the other operands. Providing a records manager that can take advantage of homomorphic operations allows certain data operations to be performed without compromising security and without accessing the minimization service.

20 Claims, 7 Drawing Sheets

(56) References Cited

OTHER PUBLICATIONS

Liu, Dongxi; Securing Outsourced Dtabases in the Cloud; Sep. 2013; Retrieved from the Internet <URL: http://link.springer.com/chapter/10.1007/978-3-642-38586-5_9>; pp. 1-24 as printed.*

Samanthula et al; An Efficient and Secure Data Sharing Framework using Homomorphic Encryption in the Cloud; 2012; Retrieved from the Internet <URL: dl.acm.org/citation.cfm?id=2347681>; pp. 1-8 as printed.*

* cited by examiner

HOMOMORPHIC CRYPTOGRAPHY MODELING IN SUPPORT OF PRIVACY POLICIES

CROSS REFERENCE TO RELATED APPLICATIONS

This patent application is a continuation-in-part of and claims priority and benefit of U.S. patent application Ser. No. 14/141,548 filed Dec. 27, 2013 entitled "SYSTEM AND METHOD FOR SPECIFICATION AND ENFORCEMENT OF A PRIVACY POLICY IN ONLINE SERVICES" and of U.S. patent application Ser. No. 14/202,477 filed Mar. 10, 2014 entitled "LOW-COST SPECIFICATION AND ENFORCEMENT OF A PRIVACY-BY-CONSENT POLICY FOR ONLINE SERVICES" and both of which are herein included by reference in their entirety.

TECHNICAL FIELD

Embodiments are related to cryptography, computer security, homomorphic cryptography, privacy, personal information, virtual machines, and internet services.

BACKGROUND

Most online (webserver) applications are not built to ensure protection of personal information. Several regulatory bodies, for example the European Union, are drafting regulations to require online service providers to explicitly ask users for the users' consent for use of the users' information. See, for example, "Proposal for a Regulation of the European Parliament and of the Council on the Protection of Individuals with regard to the Processing of Personal Data and on the Free Movement of Such Data," European Commission (Jan. 25, 2012).

The privacy-by-design approach is a generic software engineering principle stating that in development of an online service, the protection of private data is to be considered as a feature from its initial design to implementation. In particular, the proposed EU regulation requires assuming that, when the privacy feature is not considered, data protection must be guaranteed at the most restrictive requirement possible, i.e., there should be no use of the data. This requirement is known as privacy by default. In other words, every record of the application containing information about a person is considered as private and cannot be communicated or used without explicit authorization of the owner of the data. This extreme requirement makes existing online businesses difficult to conduct since the existing software infrastructure often has not been developed with privacy guarantees in place.

In addition, the designers and implementers of new online services must learn and master yet another field of endeavor—data security. Methods and systems for integrating privacy requirements into existing applications and for reducing the programming burden of including privacy requirements into new applications are needed.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

Aspects of the embodiments address limitations and flaws in the prior art by generating records managers and mapping aspects that redirect certain data operations to secure services, providing certain sensitive data only in encrypted formats, and providing for local mathematical operations on encrypted data instead of requiring all mathematical operations to be performed by a minimization service. A minimization service is a data service that is typically provided by a remote server. The minimization service restricts access to sensitive information based on a variety of factors, such as the entity requesting the data and the data owner's consent to that entity obtaining certain data. Certain homomorphic operations allow for encrypted data to be modified without first being decrypted.

It is, therefore, an aspect of the embodiments to receive code for an application having a record class definition for data records stored in a database. Most applications have numerous record class definitions for use with many different types of data records. For example, one record class definition can be used for a person's location data including home address, phone number, and similar data. Another class record definition can be used with that person's account information including invoices, invoice dates, payments, payment dates, charges, and similar data. Only one record class definition is needed to illustrate the systems and methods described herein. That record class definition has a field definition for a data field. For illustrative purposes, only one field definition is needed although in practice a record class definition often contains many field definitions.

It is also an aspect of the embodiments that the field definition is designated as a field containing data that is to be kept private. For example, telephone numbers or account balances can be designated as private data. In a privacy by default scenario, a minimization service would never provide telephone numbers or account balances. The minimization service can instead provide the data in encrypted form. In this manner, a web application can pass the data from one record to another without ever having access to the actual data. The encrypted data is often referred to as "minimized" while the clear text or un-encrypted data is often referred to as "expanded."

It is another aspect of the embodiments that a processor, based on the designation, generates a records manager and a mapping aspect for accessing and manipulating the private data. The records manager and the mapping aspect can be configured to be deployed when the application is run.

The mapping aspect includes pointcuts for identifying joins at which the records manager is to augment the functioning of the application code. For example, the application code can contain an instruction for obtaining the value in a private field. The mapping aspect identifies such instructions and in essence redirects certain data access instructions through the records manager. The records manager then obtains the data from a homomorphic minimization service. The data obtained is minimized if it is designated as private and the application does not otherwise have a right to the un-encrypted data. The records manager includes a private class definition corresponding to the record class and that contains data access fields and methods.

The private class definition can identify the associated homomorphic minimization service that provides the minimized value of data in the data field. As such, the records manager obtains a minimized value of data in the data field from the homomorphic minimization service. The homomorphic minimization service may also provide the public key that was used to minimize the value. The public key is the public member of a key pair having a public key and a private key. A datum encrypted with one of the keys can be decrypted with the other key. Unless provisioned otherwise, the homomorphic minimization service does not provide the records manager with the private key such that the application and the records manager never have access to the non-encrypted private data. In this manner the private data is kept private. Here, the public key has been applied to a data value thereby minimizing it. The minimized data value can be shared with the application by way of the records manager.

The records manager, being aware of the homomorphic properties of the minimization service and the encrypted data, can augment the functioning of the application code by performing certain operations on the data without ever decrypting it. For example, the encrypted value can be incremented by another value, n, by encrypting n with the public key and adding the encrypted values. The encrypted new data value can then be submitted back to the homomorphic minimization service or used in some other manner such as for populating a different data record. It is of further note that the minimization service can store the data in either minimized or expanded form because the minimization service can encrypt outgoing data or decrypt incoming data. For example, the minimization service can apply the private key to the encrypted new data value to obtain the expanded new data value.

Homomorphic operations are possible when proper encryption algorithms and key pairs are selected for such operations. Such operations include, for example, increment, decrement, multiply, and divide. In some situations, the result of an operation should replace the previously stored value only if some condition is met. For example, such an operation may involve decrementing the account balance, a, by n and then storing the decremented value, a-n, only if a-n>=0. If the condition is not met, then the operation should fail. The decremented value can be determined homomorphically by the records manager, but the conditional cannot be tested there because the decremented value is encrypted. The minimization service can test the conditional. The records manager can communicate the resultant value to the minimization service along with the conditional test or to a method tailored for testing a condition such "as greater than zero" or "store if greater than zero." The minimization service can return the result of the conditional if testing is all that is asked. If the condition is met, the minimization service can store the new value and return a value indicting the condition was met. If the condition is not met, then the minimization service can refuse to store the new value and return a value indicting the condition was not met.

It is a further aspect of certain embodiments that the application comprises bytecode that is executable by a virtual machine, the virtual machine being executed by a computer processing device.

It is yet a further aspect of the embodiments to use a grammar in the generation of a model of the application. The grammar can list sensitive fields and track record classes. The sensitive fields can be or include the data field having private information. The record classes can include the record class discussed above. Certain embodiments can generate the records manager as a records manager source code based on the model that can be directly compiled into code directly executable by a computer processing device or can be converted to bytecode executable by a virtual machine.

It is yet another aspect that an embodiment is a computer program product comprising non-transitory memory that stores instructions, which when executed by a processor, generate and/or deploy the application, records manager, and mapping aspect or some subset thereof.

It is still yet another aspect that an embodiment is a system comprising non-transitory memory that stores instructions, which when executed by a processor, generate and/or deploy the application, records manager, and mapping aspect or some subset thereof.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention.

DETAILED DESCRIPTION OF THE INVENTION

Figure 1:
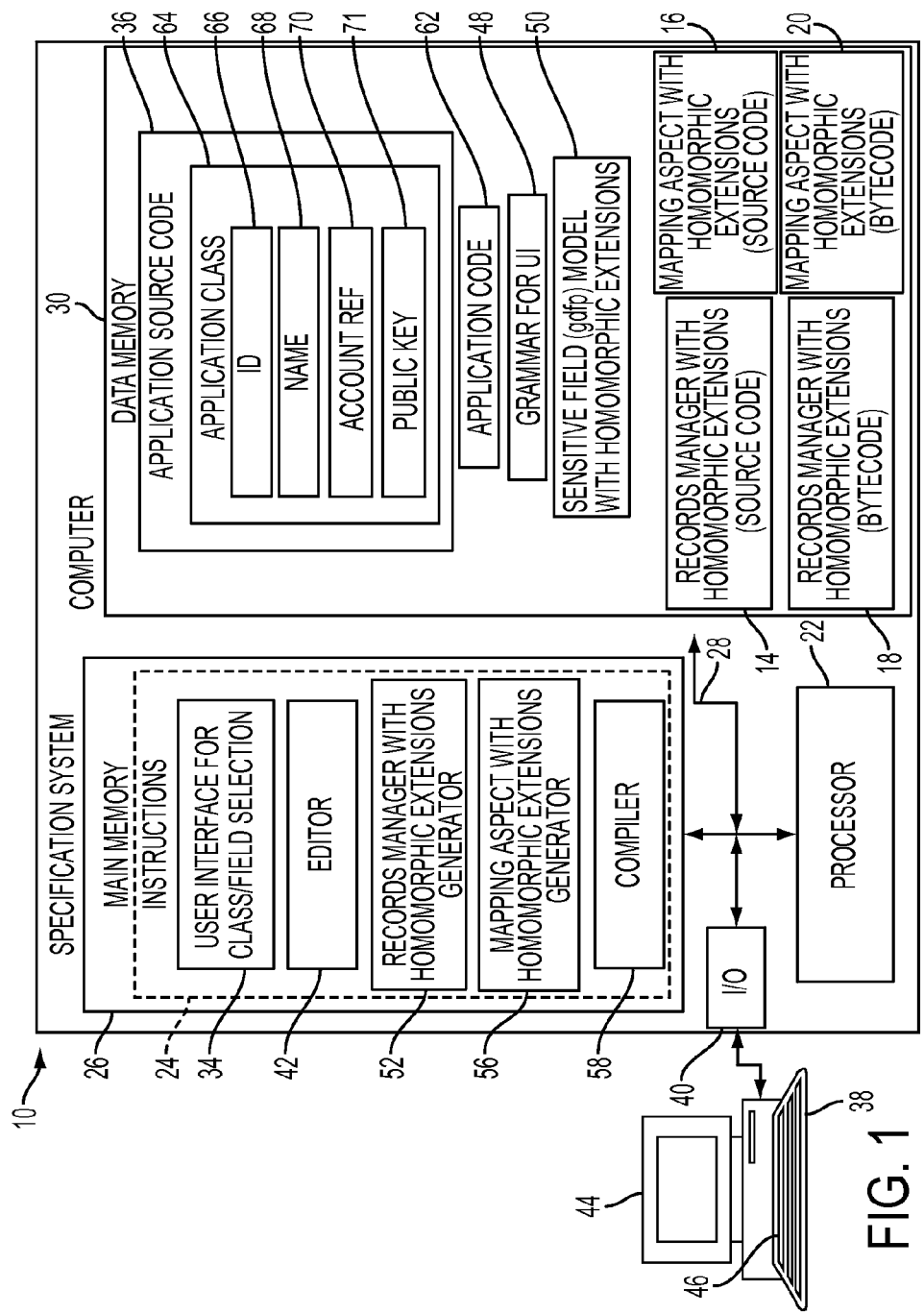
FIG. 1 illustrates a high level diagram of a system that accepts an application, privacy designations, and produces a records manager and mapping aspects with homomorphic extensions in accordance with aspects of the embodiments.

The particular values and configurations discussed in these non-limiting examples can be varied and are cited merely to illustrate embodiments and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The disclosed embodiments are described in part below with reference to flowchart illustrations and/or block diagrams of methods, systems, and computer program products and data structures according to embodiments of the invention. It will be understood that certain blocks of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a non-transitory computer-readable memory that can direct a computer or other programmable data processing apparatus to function in a particular manner such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The disclosed embodiments provide a convenient way for maintaining data privacy while also allowing private data to be manipulated outside a secured environment. Data privacy is becoming increasingly important and, in some jurisdictions, required. Access to private data can be controlled by forcing all access to go through minimizations services that allow only authorized access to private data. These minimization services can become processing bottlenecks if the only way to modify private data is by way of requests to the minimization service. Certain homomorphic operations allow for encrypted data to be modified without being first decrypted although other operands must be encrypted. Augmenting a minimization service to provide a public encryption key provides for encryption of the other operands. Providing a records manager that can take advantage of homomorphic operations allows certain data operations to be performed without compromising security and without accessing the minimization service.

U.S. patent application Ser. No. 14/141,548 filed Dec. 27, 2013 entitled "SYSTEM AND METHOD FOR SPECIFICATION AND ENFORCEMENT OF A PRIVACY POLICY IN ONLINE SERVICES" discloses systems and methods for implementing and deploying enhanced privacy of private data fields accessed by applications through the use of minimization services, mapping aspects, record managers, and Generic Digital Privacy Framework ("gdpf") models. Further teachings include the automatic and manual designation of private or sensitive data fields. It is for these teachings and disclosures, amongst others, that U.S. patent application Ser. No. 14/141,548 is herein incorporated by reference in its entirety.

U.S. patent application Ser. No. 14/202,477 filed Mar. 10, 2014 entitled "LOW-COST SPECIFICATION AND ENFORCEMENT OF A PRIVACY-BY-CONSENT POLICY FOR ONLINE SERVICES" discloses systems and methods for allowing persons to consent to the sharing of their own sensitive data with applications that would not otherwise be permitted access to that information. U.S. patent application Ser. No. 14/202,477 can be viewed as building on and enhancing the teachings of U.S. patent application Ser. No. 14/141,548. It is for these teachings and disclosures, amongst others, that U.S. patent application Ser. No. 14/202,477 is herein incorporated by reference in its entirety.

The two incorporated applications provide for privacy mechanisms where only explicitly trusted and globally trusted parties can access and manipulate private data or where a person can consent to additional parties being able to access and manipulate private data. Such privacy mechanisms require that such access be granted before an application can be fully used. For example, consider an application that authorizes a service and debits an account if and only if the account balance is greater than the cost of the service. Printing, copying, and pay per view are examples of such a service. Such an application can't be provided under privacy by default. The application can be provided under privacy by consent, but only if the person consents to the application having access to certain private data such as account balances and perhaps even the identity of the person. Many people would hesitate before consenting to a pay-per-view application having that level of data access. Other people would not bother with the consent process. Some people would just consent without considering that they may be providing a rogue application with too much access to information.

Homomorphic cryptology provides a solution by giving applications, even rogue applications, access to minimized data, but not to the expanded data. The application can store and manipulate the minimized data, but can't understand the data. Returning to the example, the pay-per-view application never knows the actual account balance. In fact, the pay-per-view application could store minimized versions of a person's name and address without ever knowing the identity of the customer. Succinctly, homomorphic cryptology provides for manipulating data without knowing what the data actually is.

Homomorphic encryption schemes allow performing some mathematical computation on encrypted data. The resulting ciphertext, when decrypted, contrarily to classical encryption schemes, will provide a value that is equal to the result of doing the same operation on the original plaintexts. For an encryption scheme E, the values a and b and an operator op, a homomorphic encryption property can be expressed as:

$$\epsilon(a) \text{ op } \epsilon(b) = \epsilon(a \text{ op } b)$$

The Paillier cryptosystem provides for homomorphic addition expressed as:

$$\epsilon(a) \cdot \epsilon(b) = \epsilon(a+b \bmod m)$$

with m being the modulus part of the public key.

The El Gamal cryptosystem provides for homomorphic multiplication expressed as:

$$\epsilon(a) \cdot \epsilon(b) = \epsilon(a \cdot b)$$

The Goldwasser-Micali cryptosystem provides for homomorphic exclusive or operations expressed as:

$$\epsilon(a) \cdot \epsilon(b) = e(a \oplus b)$$

The Brakerski cryptosystem provides for addition and multiplication under somewhat homomorphic operations.

The aforementioned cryptosystems are provided as non-limiting examples and are also asymmetric, i.e., using a pair of public and private keys. The implied constraint for privacy engine support implementation is to constantly safeguard the private key in a single trusted space, while public keys may be exchanged on the network.

In order to support homomorphic operations such as increment and decrement scenarios for a designated private field, a privacy designer needs to model the privacy policy through the three following steps:

a) Declare a homomorphic minimization/expansion service to attach to the record field;
b) Characterize internal computing (e.g., 'increment') method(s) of a sensitive class (e.g., 'UserStats') as a homomorphic treatment; and
c) Specify the treatment to be applied in place of the legacy one.

A nonlimiting example employing a gdpf model is here presented. A gdpf model, containing a privacy-by-default design, describes the default minimization services. Those minimization services supporting homomorphic operations can be specified as homomorphic minimization services. In U.S. Ser. No. 14/141,548, the gdpf language contains a rule in charge of describing the expected service to treat some private field of a record: namely the DMEService rule (Descriptor of Minimization/Expansion Service). The DMEService rule can be extended as follows:

```
DMEService:
  'Minimization:' name=ID "version" version=VERSION ("on node" node=Node)?
  ("Datatype" datatype=DataType)?
    ('offering transparency levels' levels+=TransparencyLevel+)?;
  enum Homomorphism: PAILLIER | BENOLAH | ELGAMAL | FULLY_HOMOMORPHIC
  enum DataType: STRING | BIG_INT | SOUND | IMAGE | VIDEO
```

This extension allows the privacy designer to describe the minimization principals as "Paillier" or some other predefined homomorphic algorithm and to declare homomorphic services for certain data types such as numeric values. Such a declaration could be as follows:

```
Minimization: homomo1 version M1.m2.i9 on node IP:127.0.0.1
  virtual:false secured:true
    DataType BIG_INT homomorphic PAILLIER
```

The "UserStats" class referenced earlier has a field "nbPages" that has been designated as sensitive. The nbPages field can be delegated "homomo1" such that references to that field cause the "homomo1" minimization service to be used. Note that in this example the homomorphic minimization service is running on the local machine. In practice, homomorphic minimization services can run on either local or remote machines.

Having designated a sensitive field as subject to homomorphic minimization and having designated a homomorphic minimization service for that sensitive field, the mathematical operations, aka homomorphic treatments, should be designated and provided such that the record manager which is eventually generated can implement those homomorphic treatments. Returning to the example, homomorphic treatments can be designated as follows:

```
HomomorphicTreatment:
..'{ input method:' input=[HomomorphicInput] 'parameter' aram=
[types:JvmFormalParameter]
    ('computation' comput=HomomoComputation
    ('check' test=HomomoComparison ('minGapInMillis' gap=INT)?)?
    ('defaultRes' res=DefaultTreatmentResult)?
    )? '}';
enum DefaultTreatmentResult: null | field | param | check;
enum HomomoComputation:
  none |
  increment | decrement | multiply | divide |
  inc_setField | dec_setField | mult_setField | div_setField;
enum HomomoComparison: none | equals | sup | inf | supeq | infeq ;
```

Note that homomorphic comparisons have been designated as well as versions of the basic operations that further include writing the value to the sensitive field. Much of the remaining work involves implementing the homomorphic operations such that they are properly included in and executed within the records manager. The required classes, methods, and subroutines are similar to those for other record managers and minimization service, but with augmentation by inclusion of methods for preforming arithmetic or other homomorphic operations. A further aspect is that the records manager can require an internal method for obtaining public keys while the homomorphic minimization service is provisioned to provide those public keys on request.

FIG. 1 illustrates a high level diagram of a system that accepts an application, privacy designations, and produces a records manager and mapping aspects with homomorphic extensions in accordance with aspects of the embodiments.

Figure 2:
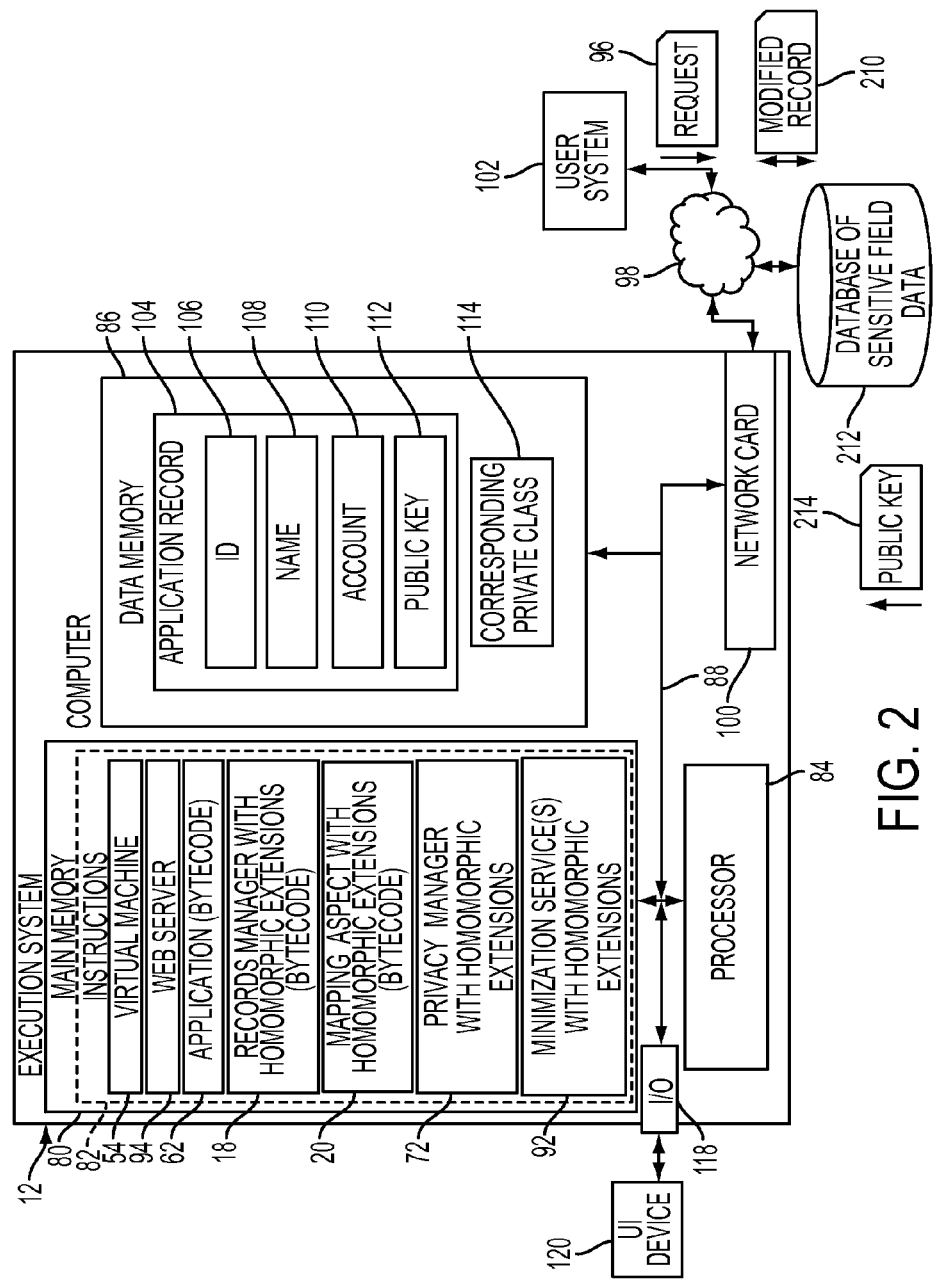
FIG. 2 illustrates a high level diagram of an application deployed along with a mapping aspect and records manager having homomorphic extensions in accordance with aspects of the embodiments.

FIG. 2 illustrates a high level diagram of an application deployed along with a mapping aspect and records manager having homomorphic extensions in accordance with aspects of the embodiments.

Figure 3:
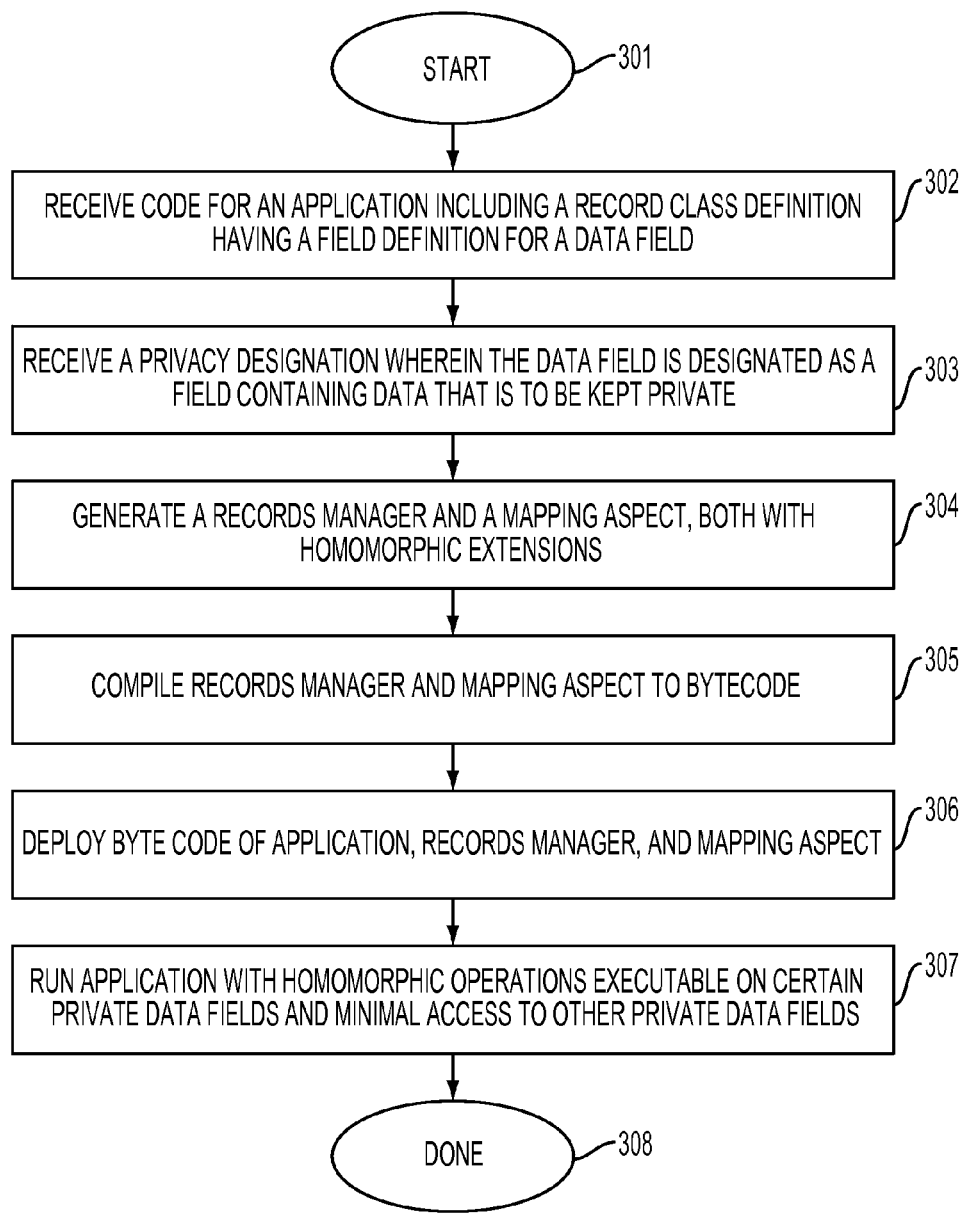
FIG. 3 illustrates a high level flow diagram of generating and deploying code for an application to run along with a mapping aspect and records manager having homomorphic extensions in accordance with aspects of the embodiments.

FIGS. 1 and 2 show functional block diagrams of computer implemented specification and application execution systems 10, 12 suitable for performing the exemplary method disclosed with respect to FIG. 3. FIG. 1 shows a specification system 10 configured to generate source code instructions 14, 16, and to compile the source code to form a records manager 18 and a mapping aspect 20, respectively, which may each include instructions in a suitable code, such as bytecode. FIG. 2 shows a system 12 for executing the application and the generated bytecode. While these are shown as separate systems, it is to be appreciated that they may be combined into a single system. Other computer systems may be configured and connected to provide other services, such as databases for persistent storage, web servers, and application logic servers to provide the logic for web servers.

With regard to FIG. 1, the system 10 includes a computer processing device (or "processor") 22 that controls the overall operation of the system 10 by execution of processing instructions 24 which are stored in an instruction memory 26 electronically connected to processor 22 by a bus 28. The processor 22 also accesses data memory 30 through bus 28 to manipulate data contained in the data memory 30. Instruction memory (main memory) 26 stores instructions 24 for several software components. Specifically, a user interface software component 34 generates a user interface to interact with a user. This allows the user to identify sensitive fields in application source code 36, which may be temporarily stored in memory 30. The user may interact with the computer system 10 via a user interface device 38 which connects to the system via an input/output (I/O) unit 40. The user may use a source code editor 42 (such as Eclipse™ or Microsoft™ Visual Studio™) to specify the record classes and fields to be subject to the privacy policy, which is separate or combined with U/I software 34.

The UI device 38 may include a display device 44, such as an LCD screen or computer monitor, and an input device 46, such as a keyboard, touchscreen, mouse or other cursor control device. There may be multiple UI devices. In addition to the I/O unit 40, the system 10 may include a network interface card (NIC) to connect system 10 to other systems by a network, e.g., a local area network (LAN) or wide area network (WAN) such as the Internet. The I/O unit 40 and/or NIC may connect via a wireless or wired connection.

To facilitate the user's identification of the sensitive classes of records and the sensitive fields, the source code editor 42 may load a grammar 48 to identify possible fields and provide user interface elements, such as various screens, a dropdown menu, or the like. The grammar may be written with a domain-specific language generator, such as Xtext. The exemplary grammar 48 is a textual grammar, referred to herein as 'gdpf' for Generic Digital Privacy Framework, expressed in a number of rules which identify fields that are likely to contain private data. From the sensitive fields identified by the user, code editor 42 may be used (e.g., also using Xtext) to generate a model 50 listing the sensitive fields and tracking the record classes which contain the sensitive fields. A records manager generator 52 generates the source code 14 for the records manager (RM or RecordsManager) class using a general-purpose programming language for a virtual machine 54 (FIG. 2), such as for example, Xtend in the case of a Java Virtual Machine (JVM). A mapping aspect generator 56 generates mapping aspect source code 16, e.g., also using Xtend. As will be appreciated, the same software component can serve as the records manager generator 52 and mapping aspect generator 56.

Once the records manager source code 14 and mapping aspect source code 16 have been generated, a compiler 58 (e.g., a Java programming compiler or Microsoft C# compiler) compiles each file to generate the records manager 18, e.g., as a bytecode file and the mapping aspect 20, e.g., as a bytecode file. These files 18, 20 may be separate or combined. The code files are deployed with the original application code 62 to implement privacy by default and privacy with homomorphic extension in the application without recompiling the original application. As will be appreciated, different software components can serve as the compiler for the records manager and mapping aspect or the compiler(s) may be combined into the generator(s) 52, 56.

In the methods described herein, a distinction is made between source code, which refers to a human-readable (textual) representation of computer code, and bytecode, which is designed to be run on a virtual machine and is not human readable. As noted above, the code in files 18, 20, 62 may be bytecode, which may be bytecode for a virtual machine. That is, the bytecode is platform independent. The bytecode may then require further compiling to run on a specific application platform. In other embodiments, the application platform runs the bytecode without modification. Examples of bytecode include Java bytecode for running on a Java virtual machine and Common Intermediate Language (or Microsoft Intermediate Language) used in the .NET framework. Both of these bytecodes may be further compiled before running an application or compiled just in time (JIT).

The methods will be described in more detail below, but, as an example, the application source code 36 may include an application record class 64 (the class may have a name such as "customer account"), which may include one or more fields 66, 68, 70, and 71. As an example, exemplary class 64 contains four fields: ID 66, name 68, account reference 70, and public key 71. The user selects name 68 and account reference 70 as sensitive fields and the class 64 is therefore considered as a sensitive records class. Other fields in the sensitive class which are not selected by the user as being sensitive, such as ID 66, are need not be considered further (in the present case, the ID field is identified as the persistency key to be used by an external storage service to associate private clear values with the applicative records). The public key 71 is illustrated as within the application class although it is more properly with the record manager and used only by the record manager. The fields 66, 68, 70, and 71 are member variables of the class 64, but are referred to as fields because that term is commonly used when describing the variables at the bytecode level.

The code generator 52 generates the RM source 14, which contains a class, called an RM class, containing a corresponding private record class for each application class 64 which has at least one sensitive field (member variable). Each sensitive field belongs to a class, and that class has a corresponding private class in the RM source 14. The corresponding private class has a member variable of the type of the sensitive class allowing objects of the corresponding private class to track objects of the sensitive class (which may be thought of as the "legacy" or "original" class). While only one is shown, it is to be appreciated that there may be at least two or multiple sensitive application classes 64, each containing at least one sensitive field (or perhaps more), and therefore there will be multiple corresponding private classes, one for each application class. The records manager source 14 and record manager bytecode 18 also have homomorphic extensions that support homomorphic operations. The record manager generator 52 can ensure that the proper homomorphic extensions are within the record manager 14, 18.

The mapping aspect file 16 contains pointcuts at which the RM class 18 will augment the functioning of the application bytecode 62 to access or operate on the data in the sensitive fields 66, 68, 70, as explained further below. Each pointcut is a set of one or more join points. When the application bytecode reaches one of the join points described in the pointcut, the piece of code associated with the pointcut is executed which causes the data in the sensitive field(s) of the application record to be modified by the records manager. As with the records manager 14, 18, the mapping aspect generator 56 ensures that the proper homomorphic extension is within the mapping aspect 16, 20.

The generated source may also contain code, not specific to the application, to cause a privacy manager 72 (see FIG. 2) to be loaded when the application is run. The privacy manager is a bootstrap class that loads configuration files, registers enforcement runner functions, and loads (or connects to an existing) minimization service. Enforcement runners are functions which, when a join is executed at a constructor or set function, look up which function is to be called for that class or field and call the function. They allow the join descriptions to be written generically and yet still call a particular function in a class of the records manager 14 by looking up the class that was constructed or field that was set in the join.

The system 10 may include a PC, such as a desktop, a laptop, palmtop computer, portable digital assistant (PDA), server computer, cellular telephone, pager, combination thereof, or other computing device or devices capable of executing instructions for performing the exemplary method or methods described herein.

The instruction memory 26 and data memory 30 may be separate or combined and may each represent any type of non-transitory computer readable medium, such as random access memory (RAM), read only memory (ROM), magnetic disk or tape, optical disk, flash memory, or holographic memory. In some embodiments, the memory 26, 30 comprises a combination of random access memory and read only memory. In some embodiments, the processor 22 and memory 26 and/or 30 may be combined in a single chip.

The I/O device 40 may include a network interface card that communicates with other devices via a computer network, such as a local area network (LAN), a wide area network (WAN), or the Internet, and may comprise a modulator/demodulator (MODEM). The digital processor 22 can be variously embodied, such as by a single core processor, a dual core processor (or more generally by a multiple core processor), a digital processor and cooperating math coprocessor, a digital controller, or the like.

With reference also to FIG. 2, the computer implemented execution system 12 includes main memory 80 which stores instructions 82 for performing the execution stage of the exemplary method and a processor 84 in communication with the main memory and with a data memory 86 for executing the instructions, all communicatively connected by a bus 88. Memory 80, processor 84, data memory 86, and bus 88 may be configured as for the corresponding hardware components of FIG. 1, except as noted. Elements that are also shown in FIG. 1 are accorded the same numerals.

The execution system 12 is configured to perform the second stage of the method which includes running the application bytecode 62 with the RM bytecode 18 and the mapping aspect bytecode 20. The bytecode files 18, 20, 62 may be run using the virtual machine 54 which either compiles the bytecode files to form native code (platform specific code) ahead of time or translates the code to native code as it is run (JIT). When the bytecode files 18, 20, 62 are loaded, they cause the privacy manager object 72 to be instantiated. This object is the bootstrap class which loads a gdpf configuration file, instantiates the record manager class and either locates or instantiates a selected minimization service 92.

The system 12 may include, for example, a web server 94 which receives requests 96 over a network 98 via a network interface, such as a network interface card 100. The requests 96 may be generated by a remote user system 102, i.e., a system which seeks to have the private data in its records maintained private when information from the records is used, released or otherwise processed in a manner which could otherwise cause the privacy of the data to be compromised. The requests from the user system 102 may include a record to be processed with one or more fields including private data. For example, a user of the user system 102 may interact with the web server 94 which in turn calls the application bytecode 62 to create a new account which creates a new variable of the class application record 104, including populating fields (member variables of instance of class application record 104) such as ID 106, name 108, account ID 100, and public key 112. Assuming that in the specification stage, the member variables name 108 and account ID 110 were designated as sensitive, then, when the application invokes either a constructor for the sensitive class application record 104 or sets one of the sensitive fields 108, 110, the pointcut in the mapping aspect bytecode 20 causes the records manager bytecode 18 to be invoked. This bytecode, using the method detailed with respect to FIG. 3, calls on the minimization service 92 to retrieve a corresponding private class 114 which computes or retrieves the values to be used as minimized values for the sensitive fields 108, 110 in place of the current field values. As will be appreciated, each field (or a group of fields) may be associated with a dedicated minimization service 92. The minimization service must have homomorphic extensions if it is to support homomorphic operations. The system 12, rather than including the minimization service(s) may include a minimization service manager which calls on the trusted minimization services for the respective fields.

The system 12 may include an input/output device 118 which communicatively connects the system with an associated user interface device 120, which can be configured analogously to UI device 38, and which may allow a user to, for example, start and stop system 12.

The output of the execution system 12 may be one or more modified application records 210 in which the sensitive data has been minimized or a request 96 in support of a homomorphic operation. The original data, extracted from those sensitive fields, is maintained by the system, separate from the records from which it is extracted, e.g., in an associated database 212, from where the original data can be retrieved when needed (e.g., for specified actions authorized by the owner of the private data). This satisfies the needs for such service providers to delegate the storage of sensitive parts of persistent records to a different storage unit, while the legacy record itself is minimized. Note that the request 96 may be a request for a public key 214 that may be stored in the associated database 212.

FIG. 3 illustrates a high level flow diagram of generating and deploying code for an application to run along with a mapping aspect and records manager having homomorphic extensions in accordance with aspects of the embodiments. After starting 301, application code is received 302. The application code includes a record class definition that has a field definition for a data field. A privacy designation is then received 303 that designates the data field as a field containing data that is to be kept private. The designation can come from a person manually designating fields as private or can come from an automated system that recognizes certain fields as private.

A records manager and a mapping aspect are then generated 304. Both of them having homomorphic extensions. The mapping aspect provides pointcuts for directing the application to branch into or call into the records manager when private data fields are to be instantiated or manipulated. The records manager provides access to homomorphic operations and to a homomorphic minimization service. The records manager and mapping aspect can be generated in source code which is more or less human readable and are thereafter compiled into bytecode 305. The bytecode application, records manager, and mapping aspect can then be deployed 306 and run 307 before the process is done 308.

Figure 4:
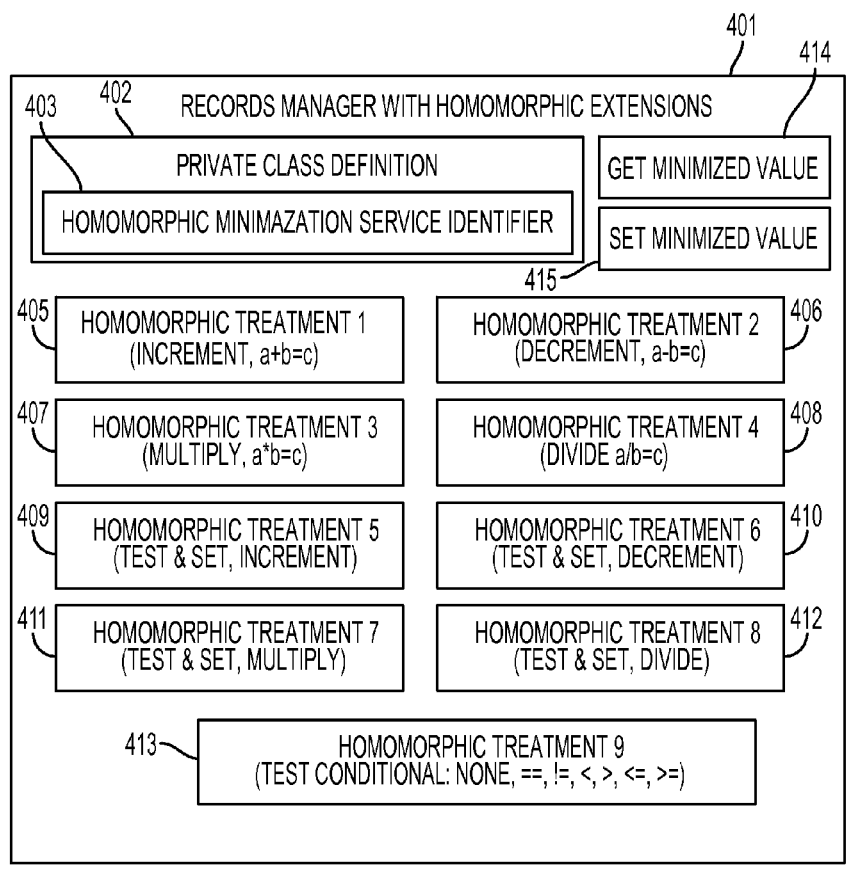
FIG. 4 illustrates a high level diagram of a records manager with homomorphic extensions in accordance with aspects of the embodiments.

FIG. 4 illustrates a high level diagram of a records manager with homomorphic extensions 401 in accordance with aspects of the embodiments. The records manager 401 has a private class definition 402 corresponding to the application's record class definition and identifying a homomorphic minimization service 403. The records manager 401 provides methods for getting 414 and setting 415 minimized values accessible through the minimization service. The record manager also provides homomorphic treatments for performing operations on minimized values. Homomorphic treatments that do not write data back to the minimization service include increment 405, decrement 406, multiply 407, and divide 408. Other operations require the involvement of the minimization service. The testing of conditionals 413 necessarily involves the minimization service because the record manager does not have access to non-encrypted values of the private data. Note that any operation that involves testing a conditional must also include a countermeasure, such as a delay, to circumvent brute force discovery of expanded values. Such countermeasures can be implemented in the records manager while implementing the countermeasures in the minimization service which helps prevent attacks from bogus record managers.

Some operations are of the "test & set" variety. For example, a user might wish to obtain something with the user's account being automatically charged. In such a scenario, the user's account balance is private, but the charge amount can be subtracted from the minimized version by way of a homomorphic treatment. If the account has enough money, then the operation should succeed with the reduced account value being stored by the minimization service. Otherwise, the operation should fail with the account value being unchanged. The records manager can calculate a minimized version of the new account balance and submit it to the minimization service as a conditional write (test and set) where the new balance is stored unless it is less than zero. In either case, the conditional test result should be returned to the record manager and from there to the application so that the application knows whether or not to fulfill the customer's request.

Figure 5:
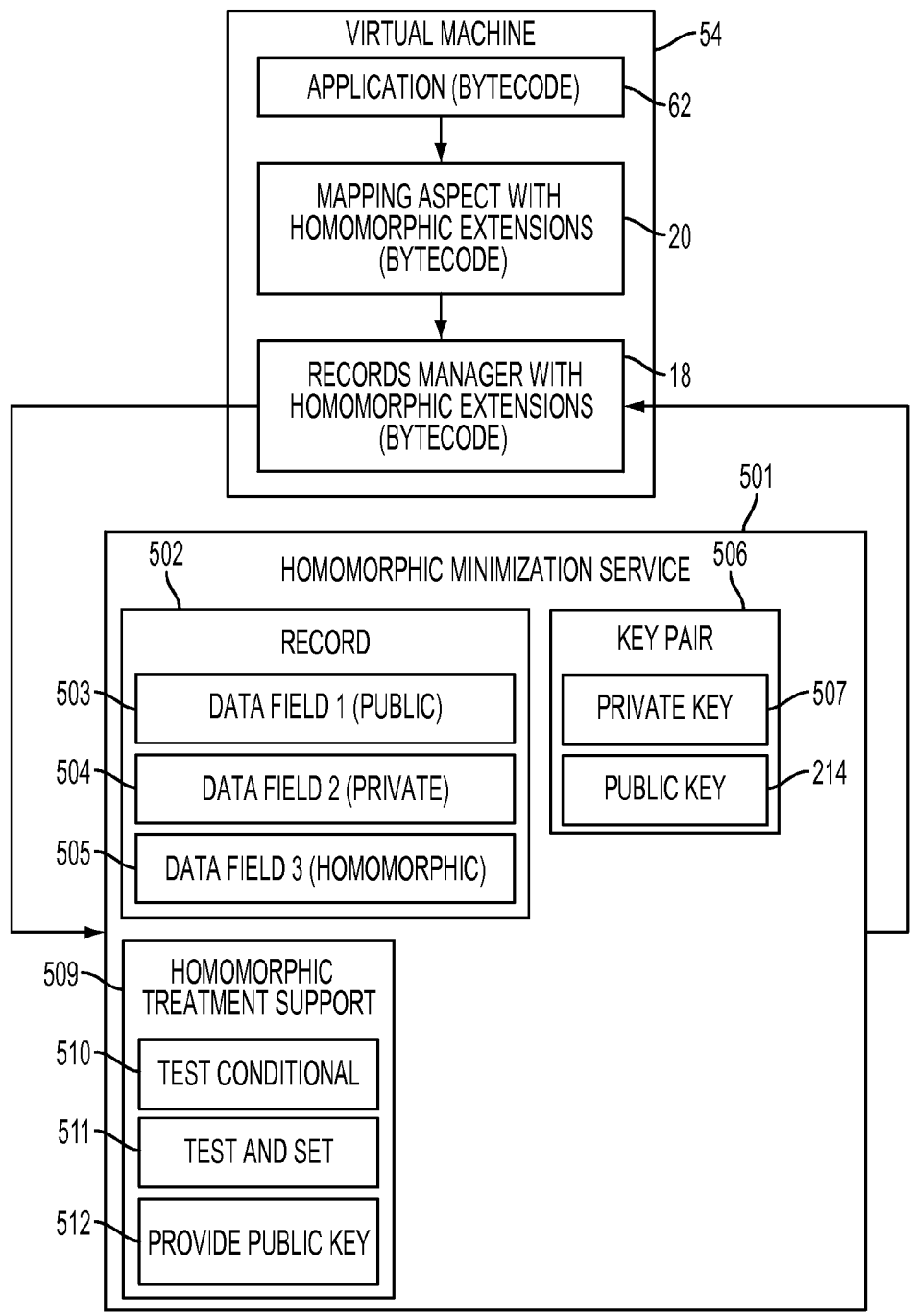
FIG. 5 illustrates a high level diagram of an application interacting with a homomorphic minimization service in accordance with aspects of the embodiments.

FIG. 5 illustrates a high level diagram depicting an application 62 interacting with a homomorphic minimization service in accordance with an example embodiment. The application 62 can obtain and set the data in record fields by writing to the minimization service 501. Here, the minimization service 501 is illustrated as accessing a record with a public filed 503, private field 504, and homomorphic field 505. The application 62 has full access to the public field data 503 and need not even access it through a minimization service 501. The private data field 504 can only be accessed through the minimization service 501. The application 62 will only receive the private field's encrypted value, if anything, unless the application 62 has permission to access the expanded value. Similarly, the homomorphic data field 505 can only be accessed through the minimization service 501 and the same restrictions apply except that the application 62, more properly the record manager 18, can manipulate the local value of the homomorphic data field. Local value means the value returned to the application by the minimization service 501. The application can attempt to write the manipulated value to the minimization service 501.

The homomorphic minimization service 501 can provide other support services 509 as well. As discussed above, it can test a conditional 510 or provide for test and set operations 511. To provide a conditional test result, the minimization service uses the private key 507 to expand the minimized value received from the application, performs the test, and returns the conditional result which is typically true or false. Another support service can involve providing the public key 512 to the records manager 18. The public key 214 is the public portion of a key pair 506. The records manager can apply the public key 506 to encrypt operands for use in homomorphic operations.

Figure 6:
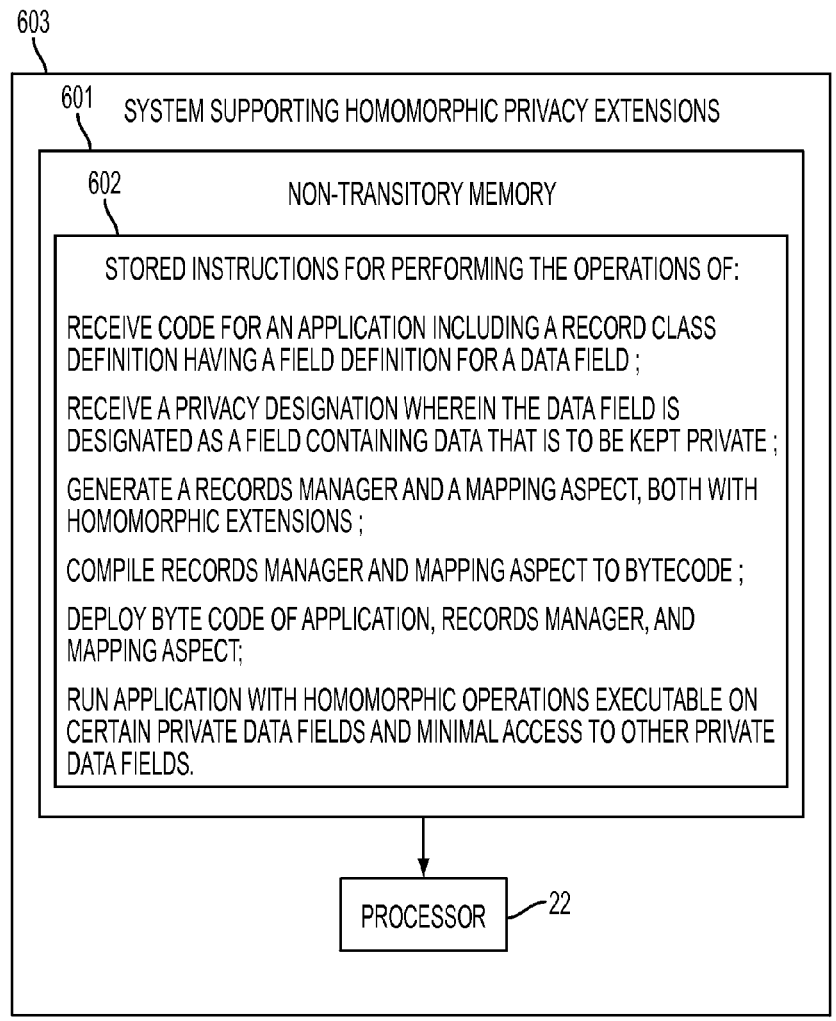
FIG. 6 illustrates a high level diagram of a system having non-transitory memory storing instructions for accepting an application, privacy designations, and producing a mapping aspect and records manager having homomorphic extensions for deployment with the application in accordance with aspects of the embodiments.

FIG. 6 illustrates a high level diagram of a system supporting homomorphic privacy extensions 603 with a non-transitory memory 601 storing instructions for accepting an application, privacy designations, and producing a mapping aspect and records manager having homomorphic extensions for deployment with the application in accordance with aspects of the embodiments 602.

Figure 7:
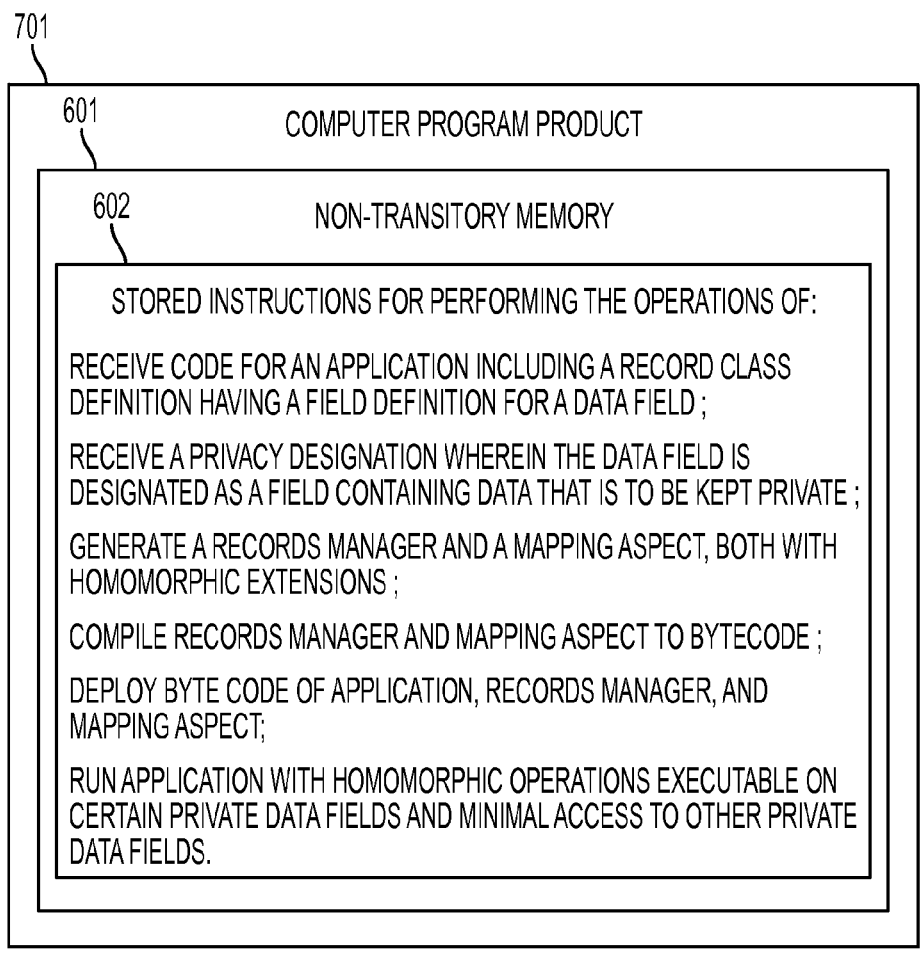
FIG. 7 illustrates a high level diagram of a computer program product having non-transitory memory storing instructions for accepting an application, privacy designations, and producing a mapping aspect and records manager having homomorphic extensions for deployment with the application in accordance with aspects of the embodiments.

FIG. 7 illustrates a high level diagram of a computer program product 701 having non-transitory memory 601 storing instructions for accepting an application, privacy designations, and producing a mapping aspect and records manager having homomorphic extensions for deployment with the application in accordance with aspects of the embodiments 602.

The invention claimed is:

1. A method for implementing a privacy policy, the method comprising:
receiving code for an application comprising a record class definition comprising a field definition for a data field;
receiving a privacy designation wherein the data field is designated as a field containing data that is to be kept private;
with a processor, based on the designation, generating a records manager and a mapping aspect,
wherein the records manager comprises a private class definition corresponding to the record class, the private class definition identifying an associated homomorphic minimization service that provides a minimized value of data in the data field wherein the minimized value of data in the data field is encrypted,
wherein the mapping aspect comprises pointcuts for identifying joins at which the records manager is to augment the functioning of the application code by calling the homomorphic minimization service to thereby obtain the minimized value of data in the data field, the minimized value being encrypted, and
wherein the records manager and the mapping aspect are configured to be deployed in association with one another and with the application such that an execution system obtaining the application after deployment and then running the application has access only to an encrypted form of the minimized data in the data field.

2. The method of claim 1 wherein the homomorphic minimization service also provides a public key wherein a key pair comprises a private key and the public key, wherein applying the private key to the minimized value of data in the data field yields a value of data in the data field that is not encrypted, and wherein applying the public key to the value of data in the data field yields the minimized value of data in the data field.

3. The method of claim 2 wherein the records manager further augments the functioning of the application code by providing a homomorphic treatment of the minimized value of data in the data field, wherein the homomorphic treatment operates on the minimized value of data in the data field, a second operand value, and the public key to produce a minimized resultant value, wherein the records manager does not have access to the private key, and wherein applying the private key to the minimized resultant value produces a resultant value equaling the value of a mathematical operation between the second operand value and the value of data in the data field.

4. The method of claim 3 wherein the resultant value equals the value of data in the data field incremented by the second operand value.

5. The method of claim 3 wherein the resultant value equals the value of data in the data field decremented by the second operand value.

6. The method of claim 3 wherein the resultant value equals the value of data in the data field divided by the second operand value.

7. The method of claim 3 wherein the resultant value equals the value of data in the data field multiplied by the second operand value.

8. The method of claim 3 wherein the records manager communicates the resultant value to the minimization service such the resultant value replaces the value of data in the data field.

9. The method of claim 3 wherein the records manager communicates the resultant value to the minimization service such that the resultant value replaces the value of data in the data field if and only if a condition is met, wherein the minimization service provides a return value indicating success if the condition is met or failure if the condition is not met.

10. The method of claim 3 wherein the records manager communicates the resultant value to the minimization service such that the minimization service provides a return value indicating success if the condition is met or failure if the condition is not met.

11. The method of claim 10 further comprising deploying the records manager, and the mapping aspect in association with the application.

12. The method of claim 11 wherein the application comprises bytecode that is executable by a virtual machine, the virtual machine being executed by a computer processing device.

13. The method of claim 3 further comprising with a grammar generating a model of the application that lists a plurality of sensitive fields and tracks a plurality of record classes wherein the sensitive fields comprise the data field, wherein the record classes comprise the record class, and wherein generating the records manager comprises generating a records manager source code based on the model.

14. The method of claim 13 wherein the generation of the records manager comprises converting the records manager source code to bytecode.

15. The method of claim 1 further comprising deploying the records manager and the mapping aspect when the application is run.

16. The method of claim 15 wherein the application comprises bytecode that is executable by a virtual machine, the virtual machine being executed by a computer processing device.

17. The method of claim 2:
- wherein the records manager further augments the functioning of the application code by providing a plurality of homomorphic treatments of the minimized value of data in the data field;
- wherein the records manager does not have access to the private key;
- wherein each of the homomorphic treatments is associated with one of a plurality of mathematical operations and operates on the minimized value of data in the data field, a second operand value, and the public key to produce a minimized resultant value;
- wherein applying the private key to the minimized resultant value produced by one of the homomorphic treatments produces a resultant value equaling the value of applying to the second operand value and the value of data in the data field that one of the mathematical operations associated with the one of the homomorphic treatments;
- wherein the mathematical operations comprise increment, decrement, multiply, and divide;
- wherein the records manager communicates the resultant value to the minimization service such that the resultant value replaces the value of data in the data field if and only if a condition is met; and
- wherein the minimization service provides a return value indicating success if the condition is met and indicating failure if the condition is not met.

18. The method of claim 17 further comprising:
- deploying the records manager and the mapping aspect when the application is run wherein the application comprises bytecode that is executable by a virtual machine, the virtual machine being executed by a computer processing device; and
- with a grammar generating a model of the application that lists a plurality of sensitive fields and tracks a plurality of record classes wherein the sensitive fields comprise the data field, wherein the record classes comprise the record class, wherein generating the records manager comprises generating a records manager source code based on the model, and wherein the generation of the records manager comprises converting the records manager source code to bytecode.

19. A computer program product comprising non-transitory memory that stores instructions which when executed by a processor, performs the method of claim 18.

20. A system comprising non-transitory memory that stores instructions for performing the method of claim 18 and a processor in communication with the non-transitory memory that executes the instructions.

* * * * *